US006272559B1

(12) United States Patent
Jones et al.

(10) Patent No.: US 6,272,559 B1
(45) Date of Patent: *Aug. 7, 2001

(54) DEFERRED RECONSTRUCTION OF OBJECTS AND REMOTE LOADING FOR EVENT NOTIFICATION IN A DISTRIBUTED SYSTEM

(75) Inventors: Peter C. Jones, Winchester; Ann M. Wollrath, Groton; James H. Waldo, Dracut; Kenneth C. R. C. Arnold, Lexington, all of MA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/044,919

(22) Filed: Mar. 20, 1998

Related U.S. Application Data

(63) Continuation-in-part of application No. 08/950,756, filed on Oct. 15, 1997.

(51) Int. Cl.[7] .................................................. G06G 13/00
(52) U.S. Cl. ............................................................. 709/330
(58) Field of Search ................................. 709/315, 316, 709/330

(56) References Cited

U.S. PATENT DOCUMENTS

| 4,491,946 | 1/1985 | Kryskow, Jr. et al. ............... 370/453 |
| 4,713,806 | 12/1987 | Oberlander et al. .................. 370/358 |
| 4,809,160 | 2/1989 | Mahon et al. ........................ 713/200 |
| 4,823,122 | 4/1989 | Mann et al. ..................... 340/825.28 |
| 4,939,638 | 7/1990 | Stephenson et al. ................. 710/244 |
| 4,956,773 | 9/1990 | Saito et al. ................................ 717/3 |
| 5,088,036 | 2/1992 | Ellis et al. ............................ 707/206 |

(List continued on next page.)

FOREIGN PATENT DOCUMENTS

| 0 300 516 A2 | 1/1989 | (EP) . |
| 0 351 536 A3 | 1/1990 | (EP) . |
| 0 384 339 A3 | 8/1990 | (EP) . |
| 0 472 874 A1 | 3/1992 | (EP) . |
| 0 474 340 A2 | 3/1992 | (EP) . |
| 0 555 997 A2 | 8/1993 | (EP) . |
| 0 565 849 A2 | 10/1993 | (EP) . |

(List continued on next page.)

OTHER PUBLICATIONS

Jim Waldo et al., "Events in an RPC Based Distributed System," 1995 USENIX Technology Conference—Jan. 16–20, 1995—New Orleans, LA, pp. 131–142.
Roger Riggs et al., "Pickling State in the Java™ System," USENIX Association Conference on Object–Oriented Technologies and Systems—Jun. 17–21, 1996, pp. 241–250.
International Search Report, Sep. 3, 1999.
Birrell et al., *Implementing Remote Procedure Calls*, ACM Transactions on Computer Systems, vol. 2, No. 1, Feb. 1984, pp. 35–59.
Mullender, *Distributed Systems*, Second Edition, Addison–Wesley, 1993.
Howard et al., *Scale and Performance in a Distributed File System*, ACM Transactions on Computer Systems, vol. 6, No. 1, Feb. 1988, pp. 51–81.
Cardelli, *Obliq, A lightweight language for network objects*, Nov. 5, 1993, pp. 1–37.

(List continued on next page.)

*Primary Examiner*—Kenneth R. Coulter
(74) *Attorney, Agent, or Firm*—Finnegan, Henderson, Farabow, Garrett & Dunner, L.L.P.

(57) ABSTRACT

Event notification in a distributed system using an object maintained in serialized form, referred to as a marshalled object. For event notification, a machine registers with a device to receive notification of particular events within a network, and a marshalled object is transmitted with a registration request.

20 Claims, 10 Drawing Sheets

U.S. PATENT DOCUMENTS

| | | | |
|---|---|---|---|
| 5,109,486 | 4/1992 | Seymour | 709/224 |
| 5,187,787 | 2/1993 | Skeen et al. | 709/314 |
| 5,218,699 | 6/1993 | Brandle et al. | 709/328 |
| 5,257,369 | 10/1993 | Skeen et al. | 709/312 |
| 5,293,614 | 3/1994 | Ferguson et al. | 707/201 |
| 5,297,283 | 3/1994 | Kelly, Jr. et al. | 709/104 |
| 5,311,591 | 5/1994 | Fischer | 713/156 |
| 5,339,435 | 8/1994 | Lubkin et al. | 717/11 |
| 5,386,568 | 1/1995 | Wold et al. | 717/10 |
| 5,390,328 | 2/1995 | Frey et al. | 709/315 |
| 5,423,042 | 6/1995 | Jalili et al. | 709/328 |
| 5,440,744 | 8/1995 | Jacobson et al. | 709/203 |
| 5,448,740 | 9/1995 | Kiri et al. | 717/8 |
| 5,455,952 | 10/1995 | Gjovaag | 717/1 |
| 5,471,629 | 11/1995 | Risch | 707/201 |
| 5,475,792 | 12/1995 | Stanford et al. | 704/233 |
| 5,475,817 | 12/1995 | Waldo et al. | 709/316 |
| 5,481,721 | 1/1996 | Serlet et al. | 709/315 |
| 5,504,921 | 4/1996 | Dev et al. | 709/223 |
| 5,511,197 | 4/1996 | Hill et al. | 709/328 |
| 5,524,244 | 6/1996 | Robinson et al. | 717/5 |
| 5,551,035 * | 8/1996 | Arnold et al. | 709/315 |
| 5,553,282 | 9/1996 | Parrish et al. | 707/10 |
| 5,555,367 | 9/1996 | Premerlani et al. | 707/4 |
| 5,557,798 | 9/1996 | Skeen et al. | 705/35 |
| 5,560,003 | 9/1996 | Nilsen et al. | 707/206 |
| 5,561,785 | 10/1996 | Blandy et al. | 711/170 |
| 5,577,231 | 11/1996 | Scalzi et al. | 703/26 |
| 5,603,031 | 2/1997 | White et al. | 709/317 |
| 5,617,537 | 4/1997 | Yamada et al. | 709/214 |
| 5,628,005 | 5/1997 | Hurvig | 707/8 |
| 5,640,564 | 6/1997 | Hamilton et al. | 709/315 |
| 5,652,888 | 7/1997 | Burgess | 709/318 |
| 5,655,148 | 8/1997 | Richman et al. | 710/8 |
| 5,659,751 | 8/1997 | Heninger | 709/332 |
| 5,671,225 | 9/1997 | Hooper et al. | 370/468 |
| 5,675,796 | 10/1997 | Hodges et al. | 709/100 |
| 5,680,573 | 10/1997 | Rubin et al. | 711/129 |
| 5,680,617 | 10/1997 | Gough et al. | 707/104 |
| 5,684,955 | 11/1997 | Meyer et al. | 709/316 |
| 5,689,709 | 11/1997 | Corbett et al. | 709/315 |
| 5,706,435 | 1/1998 | Barbara | 711/141 |
| 5,724,588 | 3/1998 | Hill et al. | 709/328 |
| 5,727,145 | 3/1998 | Nessett et al. | 713/200 |
| 5,737,607 * | 4/1998 | Hamilton et al. | 717/1 |
| 5,745,678 | 4/1998 | Herzberg et al. | 713/200 |
| 5,745,695 | 4/1998 | Gilchrist et al. | 709/227 |
| 5,745,703 | 4/1998 | Cejtin et al. | 709/238 |
| 5,754,849 * | 5/1998 | Dyer et al. | 707/101 |
| 5,757,925 | 5/1998 | Faybishenko | 709/203 |
| 5,761,656 * | 6/1998 | Ben-Shachar | 707/4 |
| 5,764,897 | 6/1998 | Khalidi | 709/201 |
| 5,768,532 | 6/1998 | Megerian | 709/245 |
| 5,774,551 | 6/1998 | Wu et al. | 713/155 |
| 5,778,228 | 7/1998 | Wei | 709/328 |
| 5,778,368 | 7/1998 | Hogan et al. | 707/10 |
| 5,787,425 | 7/1998 | Bigus | 707/6 |
| 5,787,431 | 7/1998 | Shaughnessy | 707/100 |
| 5,809,507 | 9/1998 | Cavanaugh, III | 707/103 |
| 5,813,013 | 9/1998 | Shakib et al. | 707/102 |
| 5,815,149 | 9/1998 | Mutschler, III et al. | 345/335 |
| 5,815,709 | 9/1998 | Waldo et al. | 712/300 |
| 5,815,711 | 9/1998 | Sakamoto et al. | 717/1 |
| 5,829,022 | 10/1998 | Watanabe et al. | 711/118 |
| 5,832,529 | 11/1998 | Wollrath et al. | 707/206 |
| 5,832,593 | 11/1998 | Wurst et al. | 29/750 |
| 5,835,737 | 11/1998 | Sand et al. | 710/113 |
| 5,842,018 | 11/1998 | Atkinson et al. | 707/501 |
| 5,844,553 | 12/1998 | Hao et al. | 345/329 |
| 5,845,129 | 12/1998 | Wendorf et al. | 710/200 |
| 5,860,004 | 1/1999 | Fowlow et al. | 717/1 |
| 5,860,153 | 1/1999 | Matena et al. | 711/216 |
| 5,864,862 | 1/1999 | Kriens et al. | 707/103 |
| 5,864,866 | 1/1999 | Henckel et al. | 707/103 |
| 5,872,928 | 2/1999 | Lewis et al. | 709/222 |
| 5,875,335 * | 2/1999 | Beard | 717/5 |
| 5,878,411 | 3/1999 | Burroughs et al. | 707/4 |
| 5,884,079 | 3/1999 | Furusawa | 717/1 |
| 5,887,134 | 3/1999 | Ebrahim | 709/200 |
| 5,890,158 | 3/1999 | House et al. | 707/10 |
| 5,892,904 | 4/1999 | Atkinson et al. | 713/201 |
| 5,933,497 | 8/1999 | Beetcher et al. | 705/59 |
| 5,935,249 | 8/1999 | Stern et al. | 713/201 |
| 5,940,827 | 8/1999 | Hapner et al. | 707/8 |
| 5,946,485 | 8/1999 | Weeren et al. | 717/3 |
| 5,946,694 | 8/1999 | Copeland et al. | 707/103 |
| 5,966,531 * | 10/1999 | Skeen et al. | 709/315 |
| 6,003,763 | 12/1999 | Gallagher et al. | 235/379 |

FOREIGN PATENT DOCUMENTS

| | | |
|---|---|---|
| 0 569 195 A3 | 11/1993 | (EP) . |
| 0 625 750 A2 | 11/1994 | (EP) . |
| 0 635 792 A2 | 1/1995 | (EP) . |
| 0 651 328 A1 | 5/1995 | (EP) . |
| 0 660 231 A2 | 6/1995 | (EP) . |
| 0 697 655 A2 | 2/1996 | (EP) . |
| 0 718 761 A1 | 6/1996 | (EP) . |
| 0 767 432 A2 | 4/1997 | (EP) . |
| 0 778 520 A2 | 6/1997 | (EP) . |
| 0 794 493 A2 | 9/1997 | (EP) . |
| 0 803 810 A2 | 10/1997 | (EP) . |
| 0 803 811 A2 | 10/1997 | (EP) . |
| 0 805 393 A2 | 11/1997 | (EP) . |
| 0 810 524 A1 | 12/1997 | (EP) . |
| 0 817 020 A2 | 1/1998 | (EP) . |
| 0 817 022 A2 | 1/1998 | (EP) . |
| 0 817 025 A2 | 1/1998 | (EP) . |
| 0 836 140 A2 | 4/1998 | (EP) . |
| 2 253 079 A | 8/1992 | (GB) . |
| 2 262 825 A | 6/1993 | (GB) . |
| 2 305 087 A | 3/1997 | (GB) . |
| 11-45187 | 2/1999 | (JP) . |
| WO92/07335 | 4/1992 | (WO) . |
| WO92/09948 | 6/1992 | (WO) . |
| WO94/03855 A1 | 2/1994 | (WO) . |
| WO96/03692 A1 | 2/1996 | (WO) . |
| WO96/10787 A1 | 4/1996 | (WO) . |
| WO96/18947 A1 | 6/1996 | (WO) . |
| WO96/24099 A1 | 8/1996 | (WO) . |
| WO 98/02814 | 1/1998 | (WO) . |
| WO98/04971 | 2/1998 | (WO) . |

OTHER PUBLICATIONS

Dijkstra, *Self–stabilizing Systems in Spite of Distributed Control*, Communications of the ACM, vol. 17, No. 11, Nov. 1974, pp. 643–644.

Ousterhout et al., *The Sprite Network Operting System*, Computer, IEEE, Feb. 1988, pp. 23–36.

Dourish, *A Divergence–Based Model of Synchrony and Distribution in Collaborative Systems*, Xerox Technical Report EPC–1194–102, 1994, pp. 1–10.

Sharrott et al., *ObjectMap: Integrating High Performance Resources into a Distributed Object–oriented Environment*, ICODP, 1995.

Birrell et al., *Grapevine: An Exercise in Distributed Computing*, Communications of the ACM, vol. 25, No. 4, Apr. 1982, pp. 260–274.

*Transparent Network Computing*, Locus Computing Corporation, Jan. 5, 1995.

Gray et al., *Leases: An Efficient Fault–Tolerant Mechanism for Distributed File Cache Consistency*, ACM, 1989, pp. 202–210.

Lamport et al., *The Byzantine Generals Problem*, ACM Transactions on Programming Languages and Systems, vol. 4, No. 3, Jul. 1982, pp. 382–401.

Dolev et al., *On the Minimal Synchronism Needed for Distributed Consensus*, Journal of the ACM, vol. 34, No. 1, Jan. 1987, pp. 77–97.

Mummert et al., *Long Term Distributed File Reference Tracing: Implementation and Experience*, Carnegie Mellon University School of Computer Science, Nov. 1994, pp. 1–28.

Gelernter et al., *Parallel Programming in Linda*, Yale University, Jan. 1985, pp. 1–21.

Cannon et al., *Adding Fault–Tolerant Transaction Processing to LINDA*, Software–Practice and Experience, vol. 24(5), May 1994, pp. 449–466.

Kambhatla et al., *Recovery with Limited Replay: Fault–Tolerant Processes in Linda*, Oregon Graduate Institute, Technical Report CSIE 90–019, Sep. 1990, pp. 1–16.

Anderson et al., *Persistent Linda: Linda + Transactions + Query Processing*, Proceedings of the 13th Symposium of Fault Tolerant Systems, 1994, pp. 93–109.

Gelernter, *Generative Communication in Linda*, ACM Transactions on Programming Languages and Systems, vol. 7, No. 1, Jan. 1985, pp. 80–112.

Carriero et al., *Distributed Data Structures in Linda*, Principals of Programming Language, 1986, pp. 1–16.

Pinakis, *Using Linda as the Basis of an Operating System Microkernel*, University of Western Australia, Department of Computer Science, Aug. 1993, pp. 1–165.

LINDA Database Search, Jul. 20, 1995, pp. 1–68.

Carriero et al, *Distributed Data Structures in Linda*, Yale Research Report YALEU/DCS/RR–438, Nov. 1985.

Agha et al., *Actorspaces: An Open Distributed Programming Paradigm*, University of Illinois, Report No. UIUCDCS–R–92–1766, Open Systems Laboratory TR No. 8, Nov. 1992, pp. 1–12.

Ahmed et al., *A Program Building Tool for Parallel Applications*, Yale University, Dec. 1, 1993, pp. 1–23.

Liskov et al., *Distributed Object Management in Thor*, International Workshop on Distributed Object Management, 1992, pp. 12.

Coulouris et al., *Disbributed Systems Concepts and Designs*, Second Edition, Addison–Wesley, 1994.

Birrell et al., *Network Objects*, DEC SRC Research Report 115, Feb. 28, 1994.

Birrell et al., *Distributed Garbage Collection for Network Objects*, DEC SRC Research Report 116, Dec. 15, 1993.

Jaworski, *Java 1.1 Developer's Guide*, Sams.net, 1997.

Wollrath et al., *A Distributed Object Model for the Java™ System*, USENIX Association, Conference on Object–Oriented Technologies and Systems, Jun. 17–21, 1996.

Harris et al., *Proposal for a General Java Proxy Class for Distributed Systems and Other Uses*, Netscape Communications Corp., Jun. 25, 1997.

Hamilton, *Java and the Shift to Net–Centric Computing* Computer, Aug. 1996, pp. 31–39.

Chung et al., *A 'Tiny' Pascal Compiler: Part 1: The P–Code Interpreter*, BYTE Publications, Inc., Sep. 1978.

Chung et al., *A 'Tiny' Pascal Compiler: Part 2: The P–Compiler*, BYTE Publications, Inc., Oct. 1978.

Thompson, *Regular Expression Search Algorithm*, Communications of the ACM, Vol. II, No. 6, p. 149 et seq., Jun. 1968.

Mitchell et al., *Mesa Language Manual*, Xerox Corporation., 1978.

McDaniel, *An Analysis of a Mesa Instruction Set*, Xerox Corporation, May 1982.

Pier, *A Retrospective on the Dorado, A High–Performance Personal Computer*, Xerox Corporation, Aug. 1983.

Pier, *A Retrospective on the Dorado, A High–Performance Personal Computer*, IEEE Conference Proceedings, The 10th Annual international Symposium on Computer Architecture, 1983.

Krasner, *The Smalltalk–80 Virtual Machine*, BYTE Publications Inc., Aug. 1991, pp. 300–320.

Birrell, *Operating Systems Review*, ACM Press, vol. 27, No. 5, Dec. 1993, pp. 217–230.

*Remote Method Invocation Specification*, Sun Microsystems, Inc., (1997), http://java.sun.com/products/jdk/1.1/docs/guide/rmi/spec/rimTOC.doc.html.

Alexander, et al., "Active Bridging", Proceedings of the ACM/SIGCOMM'97 Conference, Cannes, France, 9/97 .

Anonymous: "Change–Notification Service for Shared Files" IBM Technical Disclosure Bulletin, vol. 36, No. 8, pp. 77–82, XP002108713 New York, US No Date.

Anonymous: "Resource Preemption for Priority Scheduling." Nov. 1973. IBM Technical Disclosure Bulletin, vol. 16, No. 6, p. 1931 XP002109435 New York, US.

Beech et al., "Object Databases as Generalizations of Relational Databases," Computer Standards & Interfaces, vol. 13, Nos. 1/3, pp. 221–230, (Jan. 1991) Amsterdam, NL.

Bertino et al., "Object–Oriented Database Management Systems: Concepts and Issues," Computer, vol. 24, No. 4, pp. 33–47, (Apr. 1991), Los Alamitos, CA.

Betz, Mark; "Interoperable objects: laying the foundation for distributed object computing"; Dr. Dobb's Journal, vol. 19, No. 11, p. 18(13); (Oct. 1994).

Bevan, D.I., "An Efficient Reference Counting Solution To The Distributed Garbage Collection Problem", Parall Computing, NL, Elsevier Publishers, Amsterdam, vol. 9, No. 2, pp. 179–192 No Date.

Birrell et al., "Implementing Remote Procedure Calls", ACM Transactions on Computer Systems, vol. 2, No. 1, Feb. 1984, pp. 39–59.

Dave A et al: "Proxies, Application Interface, and Distributed Systems", Proceedings International Workshop on Object Orientation in Operating Systems, Sep. 24, 1992, pp. 212–220.

Deux O et al: "The 02 System" Communications of the Association for Computing Machinery, vol. 34, No. 10, Oct. 1, 1991, pp. 34–48.

Drexler, K. Eric, et al., "Incentive Engineering for Computational Resource Management," The Ecology of Computation, Elsevier Science Publishers B.V., 1988, pp. 231–266.

Droms, R., "RFC 1541 Dynamic Host Configuration Protocol", HTTP://WWW.CIS.OHIO–STATE.EDU/HTBIN/RFC/RFC1541.HTML, Oct. 1993, pp. 1–33.

Emms J: "A Definition of an Access Control Systems Language" Computer Standards and Interfaces, vol. 6, No. 4, Jan. 1, 1987, pp. 443–454.

Gosling et al., "The Java (TM) Language Specification", Addison–Wesley, 1996.

Gottlob et al., "Extending Object–Oriented Systems with Roles," ACM Transactions on information systems, vol. 14, No. 3, pp. 268–296 (Jul. 1996).

Guth, Rob: "JavaOne: Sun to Expand Java Distributed Computing Effort", "HTTP://WWW.SUNWORLD.COM/SWOL–02–1998/SWOL–02–SUNSPOTS.HTML," XP–002109935, P.1, 1998.

Hamilton et al., "Subcontract: a flexible base for distributed programming"; Proceedings of 14th Symposium of Operating System Principles; (Dec. 1993).

Hartman, J., Manber, U., et al., Liquid Software: A new paradigm for networked systems, Technical Report 96–11, Department of Comp. Sci., Univ. of Arizona, 6/96.

Hunt, N., "IDF: A Graphical Data Flow Programming Language for Image Processing and Computer Vision", Proceedings of the International Conference on Systems, Man, and Cybernetics, Los Angeles, Nov. 4–7, pp. 351–360, (1990).

IBM (TM) Technical Disclosure Bulletin, "Object Location Algorithm," vol. 36, No. 09B, pp. 257–258, Sep. 1993.

IBM (TM) Technical Disclosure Bulletin, "Retrieval of Qualified Variables Using Extendible Hashing," vol. 36, No. 12, pp. 301–303, Dec. 1993.

IBM: "Chapter 6—Distributed SOM (DSOM)" Somobjects Developer Toolkit Users Guide, Version 2.1, Oct. 1994 (1994–10), pp. 6–1–6–90.

Jones, Richard, et al., "Garbage Collection: Algorithms for Automatic Dynamic Memory Management," pp. 165–175, John Wiley & Sons, 1996.

Kay, Michael H. et al., "An Overview of the Raleigh Object–Oriented Database System", ICL Technical Journal, vol. 7, No. 4, pp. 780–798, (Nov. 1991), Oxford, GB.

Kougiouris et al.; "Support for Space Efficient Object Invocation in Spring"; (Sep. 1994).

Lindholm et al., "The Java (TM) Virtual Machine Specification", Addison Wesley, 1996.

Mitchell et al.; "An Overview of the Spring System"; (Feb. 1994).

Orfali R. et al., "The Essential Distributed Objects Survival Guide," Chapter 11: Corba Commercial ORBs, pp. 203–215, John Wiley & Sons, Inc., (1996).

Rosenberry et al., "Understanding DCE"; Chapters 1–3, 6; (1992).

Venners, B., "Jini Technology, Out of the Box", JAVA-WORLD, 'Online!, pp 1–4, Dec. 1998.

Wilson, P.R., et al., "Design of the Opportunistic Garbage Collector," Proceedings of the Object Oriented Programming Systems Languages And Applications Conference, New Orleans, vol. 24, No. 10, Oct. 1989.

Wu, Xuequn, "A Type system for an Object–Oriented Database System," Proceedings of the International Computer Software and Applications Conference (COMPSAC), pp. 333–338, Sep. 11–13, 1991, Tokyo, Japan.

Yemini, Y. and S. da silva, "Towards Programmable Newtorks", IFIP/IEEE International Workshop on Distributed Systems: Operations and Management, L'Aquila, Italy, 10/96.

Yin J. et al., "Using Leases to Support Server Driven Consistency in Large–Scale Systems", Computer Services Department, University of Texas at Austin, p. 185–294.

Microsoft Press Computer Dictionary, 2nd Edition; p. 276, 1994.*

* cited by examiner

DEFERRED RECONSTRUCTION OF OBJECTS AND REMOTE LOADING FOR EVENT NOTIFICATION IN A DISTRIBUTED SYSTEM

REFERENCE TO RELATED APPLICATIONS

The present application is a continuation-in-part of U.S. patent application Ser. No. 08/950,756, filed on Oct. 15, 1997, and entitled "Deferred Reconstruction of Objects and Remote Loading in a Distributed System," now allowed, which is incorporated herein by reference.

The following identified U.S. patent applications are relied upon and are incorporated by reference in this application as if fully set forth.

Provisional U.S. patent application Ser. No. 60/067,048, entitled "Distributed Computing System," filed on Feb. 26, 1998.

U.S. patent application Ser. No. 09/044,923, entitled "Method and System for Leasing Storage," now allowed, and filed on the same date herewith.

U.S. patent application Ser. No. 09/044,838, entitled "Method, Apparatus, and Product for Leasing of Delegation Certificates in a Distributed System," now allowed, and filed on the same date herewith.

U.S. patent application Ser. No. 09/044,834, entitled "Method, Apparatus and Product for Leasing of Group Membership in a Distributed System," and filed on the same date herewith.

U.S. patent application Ser. No. 09/044,916, entitled "Leasing for Failure Detection," now U.S. Pat. No. 6,016,500, and filed on the same date herewith.

U.S. patent application Ser. No. 09/044,933, entitled "Method for Transporting Behavior in Event Based System" and filed on the same date herewith.

U.S. patent application Ser. No. 09/044,938, entitled "Methods and Apparatus for Remote Method Invocation," and filed on the same date herewith.

U.S. patent application Ser. No. 09/045,652, entitled "Method and System for Deterministic Hashes to Identify Remote Methods," now U.S. Pat. No. 6,134,603, and filed on the same date herewith.

U.S. patent application Ser. No. 09/044,790, entitled "Method and Apparatus for Determining Status of Remote Objects in a Distributed System," and filed on the same date herewith.

U.S. patent application Ser. No. 09/044,930, entitled "Downloadable Smart Proxies for Performing Processing Associated with a Remote Procedure Call in a Distributed System," and filed on the same date herewith.

U.S. patent application Ser. No. 09/044,917, entitled "Suspension and Continuation of Remote Methods," now allowed, and filed on the same date herewith.

U.S. patent application Ser. No. 09/044,835, entitled "Method and System for Multi-Entry and Multi-Template Matching in a Database," now U.S. Pat. No. 6,182,083, and filed on the same date herewith.

U.S. patent application Ser. No. 09/044,837, entitled "Method and System for In-Place Modifications in a Database," now allowed, and filed on the same date herewith.

U.S. patent application Ser. No. 09/044,945, entitled "Method and System for Typesafe Attribute Matching in a Database," and filed on the same date herewith.

U.S. patent application Ser. No. 09/044,931, entitled "Dynamic Lookup Service in a Distributed System," now U.S. Pat. No. 6,185,611, and filed on the same date herewith.

U.S. patent application Ser. No. 09/044,939, entitled "Apparatus and Method for Providing Downloadable Code for Use in Communicating with a Device in a Distributed System," and filed on the same date herewith.

U.S. patent application Ser. No. 09/044,826, entitled "Method and System for Facilitating Access to a Lookup Service," and filed on the same date herewith.

U.S. patent application Ser. No. 09/044,932, entitled "Apparatus and Method for Dynamically Verifying Information in a Distributed System," and filed on the same date herewith.

U.S. patent application Ser. No. 09/030,840, entitled "Method and Apparatus for Dynamic Distributed Computing Over a Network," and filed on Feb. 26, 1998.

U.S. patent application Ser. No. 09/044,936, entitled "An Interactive Design Tool for Persistent Shared Memory Spaces," and filed on the same date herewith.

U.S. patent application Ser. No. 09/044,934, entitled "Polymorphic Token-Based Control," and filed on the same date herewith.

U.S. patent application Ser. No. 09/044,915, entitled "Stack-Based Access Control," now U.S. Pat. No. 6,138,238, and filed on the same date herewith.

U.S. patent application Ser. No. 09/044,944, entitled "Stack-Based Security Requirements," now allowed, and filed on the same date herewith.

U.S. patent application Ser. No. 09/044,933, entitled "Per-Method Designation of Security Requirements," now allowed, and filed on the same date herewith.

FIELD OF THE INVENTION

The present invention relates to a system and method for transmitting objects between machines in a distributed system and more particularly relates to deferred reconstruction of objects for event notification in a distributed system.

BACKGROUND OF THE INVENTION

Distributed programs which concentrate on point-to-point data transmission can often be adequately and efficiently handled using special-purpose protocols for remote terminal access and file transfer. Such protocols are tailored specifically to the one program and do not provide a foundation on which to build a variety of distributed programs (e.g., distributed operating systems, electronic mail systems, computer conferencing systems, etc.).

While conventional transport services can be used as the basis for building distributed programs, these services exhibit many organizational problems, such as the use of different data types in different machines, lack of facilities for synchronization, and no provision for a simple programming paradigm.

Distributed systems usually contain a number of different types of machines interconnected by communications networks. Each machine has its own internal data types, its own address alignment rules, and its own operating system. This heterogeneity causes problems when building distributed systems. As a result, program developers must include in programs developed for such heterogeneous distributed systems the capability of dealing with ensuring that information is handled and interpreted consistently on different machines.

However, one simplification is afforded by noting that a large proportion of programs use a request and response interaction between processes where the initiator (i.e., program initiating a communication) is blocked waiting until the response is returned and is thus idle during this time.

This can be modeled by a procedure call mechanism between processes. One such mechanism is referred to as the remote procedure call (RPC).

RPC is a mechanism for providing synchronized communication between two processes (e.g., program, applet, etc.) running on the same machine or different machines. In a simple case, one process, e.g., a client program, sends a message to another process, e.g., a server program. In this case, it is not necessary for the processes to be synchronized either when the message is sent or received. It is possible for the client program to transmit the message and then begin a new activity, or for the server program's environment to buffer the incoming message until the server program is ready to process a new message.

RPC, however, imposes constraints on synchronism because it closely models the local procedure call, which requires passing parameters in one direction, blocking the calling process (i.e., the client program) until the called procedure of the server program is complete, and then returning a response. RPC thus involves two message transfers, and the synchronization of the two processes for the duration of the call.

The RPC mechanism is usually implemented in two processing parts using the local procedure call paradigm, one part being on the client side and the other part being on the server side. Both of these parts will be described below with reference to FIG. 1.

FIG. 1 is a diagram illustrating the flow of call information using an RPC mechanism. As shown in FIG. 1, a client program 100 issues a call (step 102). The RPC mechanism 101 then packs the call as arguments of a call packet (step 103), which the RPC mechanism 101 then transmits to a server program 109 (step 104). The call packet also contains information to identify the client program 100 that first sent the call. After the call packet is transmitted (step 104), the RPC mechanism 101 enters a wait state during which it waits for a response from the server program 109.

The RPC mechanism 108 for the server program 109 (which may be the same RPC mechanism as the RPC mechanism 101 when the server program 109 is on the same platform as the client program 100) receives the call packet (step 110), unpacks the arguments of the call from the call packet (step 111), identifies, using the call information, the server program 109 to which the call was addressed, and provides the call arguments to the server program 109.

The server program receives the call (step 112), processes the call by invoking the appropriate procedure (step 115), and returns a response to the RPC mechanism 108 (step 116). The RPC mechanism 108 then packs the response in a response packet (step 114) and transmits it to the client program 100 (step 113).

Receiving the response packet (step 107) triggers the RPC mechanism 101 to exit the wait state and unpack the response from the response packet (step 106). RPC 101 then provides the response to the client program 100 in response to the call (step 105). This is the process flow of the typical RPC mechanism modeled after the local procedure call paradigm. Since the RPC mechanism uses the local procedure call paradigm, the client program 100 is blocked at the call until a response is received. Thus, the client program 100 does not continue with its own processing after sending the call; rather, it waits for a response from the server program 109.

The Java™ programming language is an object-oriented programming language that is typically compiled into a platform-independent format, using a bytecode instruction set, which can be executed on any platform supporting the Java virtual machine (JVM). This language is described, for example, in a text entitled "The Java Language Specification" by James Gosling, Bill Joy, and Guy Steele, Addison-Wesley, 1996, which is incorporated herein by reference. The JVM is described, for example, in a text entitled "The Java Virtual Machine Specification," by Tim Lindholm and Frank Yellin, Addison Wesley, 1996, which is incorporated herein by reference. Java and Java-based trademarks are trademarks or registered trademarks of Sun Microsystems, Inc. in the United States and other countries.

Because the JVM may be implemented on any type of platform, implementing distributed programs using the JVM significantly reduces the difficulties associated with developing programs for heterogenous distributed systems. Moreover, the JVM uses a Java remote method invocation (RMI) system that enables communication among programs of the system. RMI is explained in, for example, the following document, which is incorporated herein by reference: Remote Method Invocation Specification, Sun Microsystems, Inc. (1997), which is available via universal resource locator (URL) www.javasoft.com/products/jdk/1.1/docs/guide/rmi/spec/rmiTOC.doc.html.

FIG. 2 is a diagram illustrating the flow of objects in an object-oriented distributed system 200 including machines 201 and 202 for transmitting and receiving method invocations using the JVM. In system 200, machine 201 uses RMI 205 for responding to a call for object 203 by converting the object into a byte stream 207 including an identification of the type of object transmitted and data constituting the object. While machine 201 is responding to the call for object 203, a process running on the same or another machine in system 200 may continue operation without waiting for a response to its request.

Machine 202 receives the byte stream 207. Using RMI 206, machine 202 automatically converts it into the corresponding object 204, which is a copy of object 203 and which makes the object available for use by a program executing on machine 202. Machine 202 may also transmit the object to another machine by first converting the object into a byte stream and then sending it to the third machine, which also automatically converts the byte stream into the corresponding object.

The automatic reconstruction of the objects from the byte stream in this manner sometimes requires unnecessary processing. For example, there are times when a call is made that does not require actual or immediate interaction with the object, both of which require conversion of the byte stream to object form. Instead, a call may require passing the object to another call or storing it for later use. In this situation, the reconstruction of the object on an intermediate machine is unnecessary, especially if the object is to be transmitted to another machine. Examples of such a situation include transmission of objects for notification of events in a distributed system. Accordingly, it is desirable to more efficiently transmit objects in a distributed system without the unneeded conversion of a byte stream to an object on intermediate machines that have no use for the object, or the premature conversion of the byte stream before a process on the receiving machine requires access to the object.

SUMMARY OF THE INVENTION

A method consistent with the present invention specifies an object associated with a request for notification of a particular event within a distributed system. The object is converted into a stream containing a self-describing form of the object, and the stream is provided for selective transmission to a machine where the object is reconstructed by accessing program code identified in the stream upon occurrence of the event.

Another method consistent with the present invention receives at a first machine a stream containing a self-describing form of an object associated with a request for notification of a particular event within a distributed system. The method includes determining whether to send the stream to a second machine and selectively sending the stream to the second machine for reconstruction of the object by accessing program code identified in the stream, the first machine providing notification of the event.

An apparatus consistent with the present invention specifies an object associated with a request for notification of a particular event within a distributed system. The apparatus converts the object into a stream containing a self-describing form of the object and provides the stream for selective transmission to a machine where the object is reconstructed by accessing program code identified in the stream upon occurrence of the event.

Another apparatus consistent with the present invention receives at a first machine a stream containing a self-describing form of an object associated with a request for notification of a particular event within a distributed system. The apparatus determines whether to send the stream to a second machine and selectively sends the stream to the second machine for reconstruction of the object by accessing program code identified in the stream, the first machine providing notification of the event.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Overview

Figure 1:
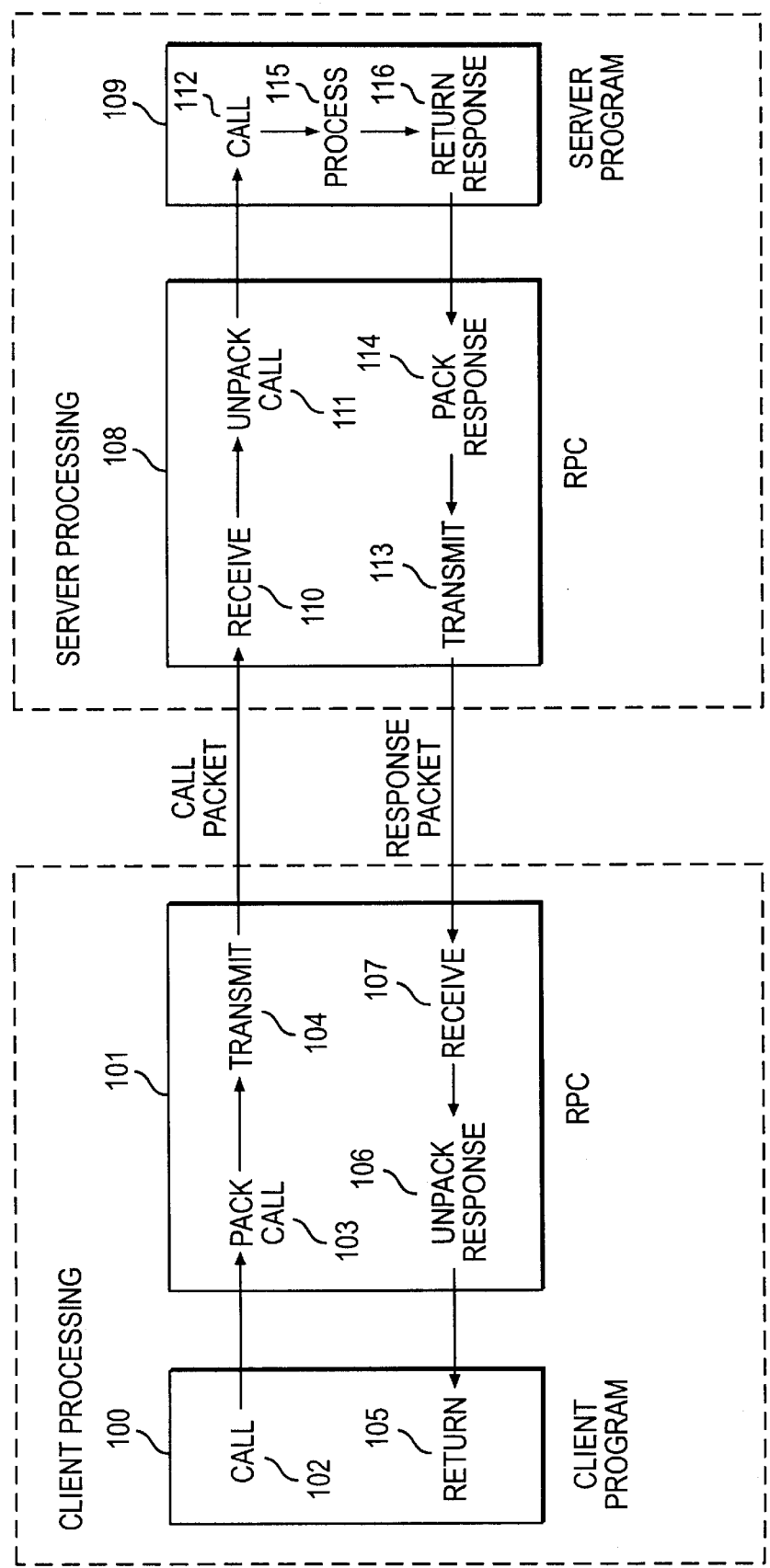
FIG. 1 is a diagram illustrating the flow of call information using an RPC mechanism.
Figure 2:
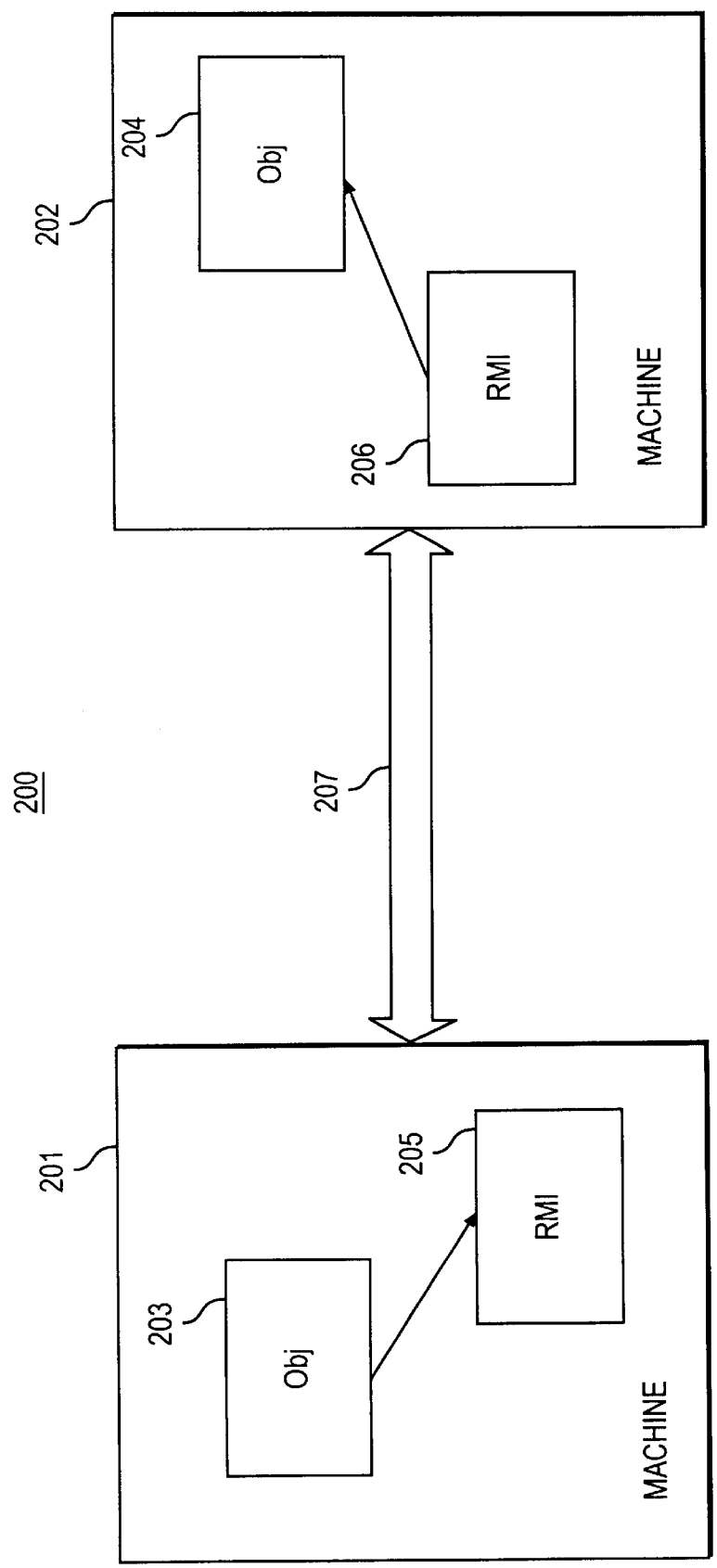
FIG. 2 is a diagram illustrating the transmission of objects in an object-oriented distributed system.

Systems consistent with the present invention efficiently transfer objects using a variant of an RPC or RMI, passing arguments and return values from one process to another process each of which may be on different machines. In such cases, it is desirable to defer reconstruction of the object and downloading of code associated with such object reconstruction until it is needed by the program. The term "machine" is used in this context to refer to a physical machine or a virtual machine. Multiple virtual machines may exist on the same physical machine. Examples of RPC systems include distributed computed environment (DCE) RPC and Microsoft distributed common object model (DCOM) RPC.

An example of how this is accomplished is by making a self-describing stream a firstclass entity in the system, meaning that it exists within a type system of a programming language and can be accessed and manipulated by instructions written in that language. A stream is typically a sequence of characters, such as a bit pattern, capable of transmission, and a self-describing byte stream is a byte stream that contains enough information such that it can be converted back into the corresponding object.

An object called a "marshalled object" comprises the self-describing stream. Such marshalled objects can typically be produced from any object that can be passed from one address space to another, and they can be stored, passed to other objects, or used to reconstruct an object of the original type on demand. The advantage of using marshalled objects is that the reconstruction of an object is deferred until a process having access to the marshalled object directly invokes the creation of the object using the marshalled object. Any downloading of code required to operate on the object is deferred until the marshalled object is used to create a copy of the original object, which was previously used to produce the marshalled object.

Accordingly, in cases where the object is not used, but rather is stored for later retrieval or passed along to another process, RMI does not download the code required for reconstruction of the object. This may result in considerable efficiencies, both in time and in code storage space.

Event notification, for example, may occur through use of a marshalled object. For event notification, a machine registers with a device to receive notification of particular events within a distributed network. The device transmits a request for registration along with a marshalled object to an event generator, which stores the marshalled object for possible later transmission. If the event occurs, the event generator sends notification of the event including the marshalled object to an event listener. The event listener may reconstruct the marshalled object, which may contain information relating to the event. The event listener may be the same as the device requesting notification. Events include, for example, a change in the state or occurrence of an object. More specific examples of events in a distributed system include, but are not limited to, the following: a "click" by a key or cursor-control device; an overlapping window on a display device; a device joining a network; a user logging onto a network; and particular user actions.

Distributed Processing System

Figure 3:
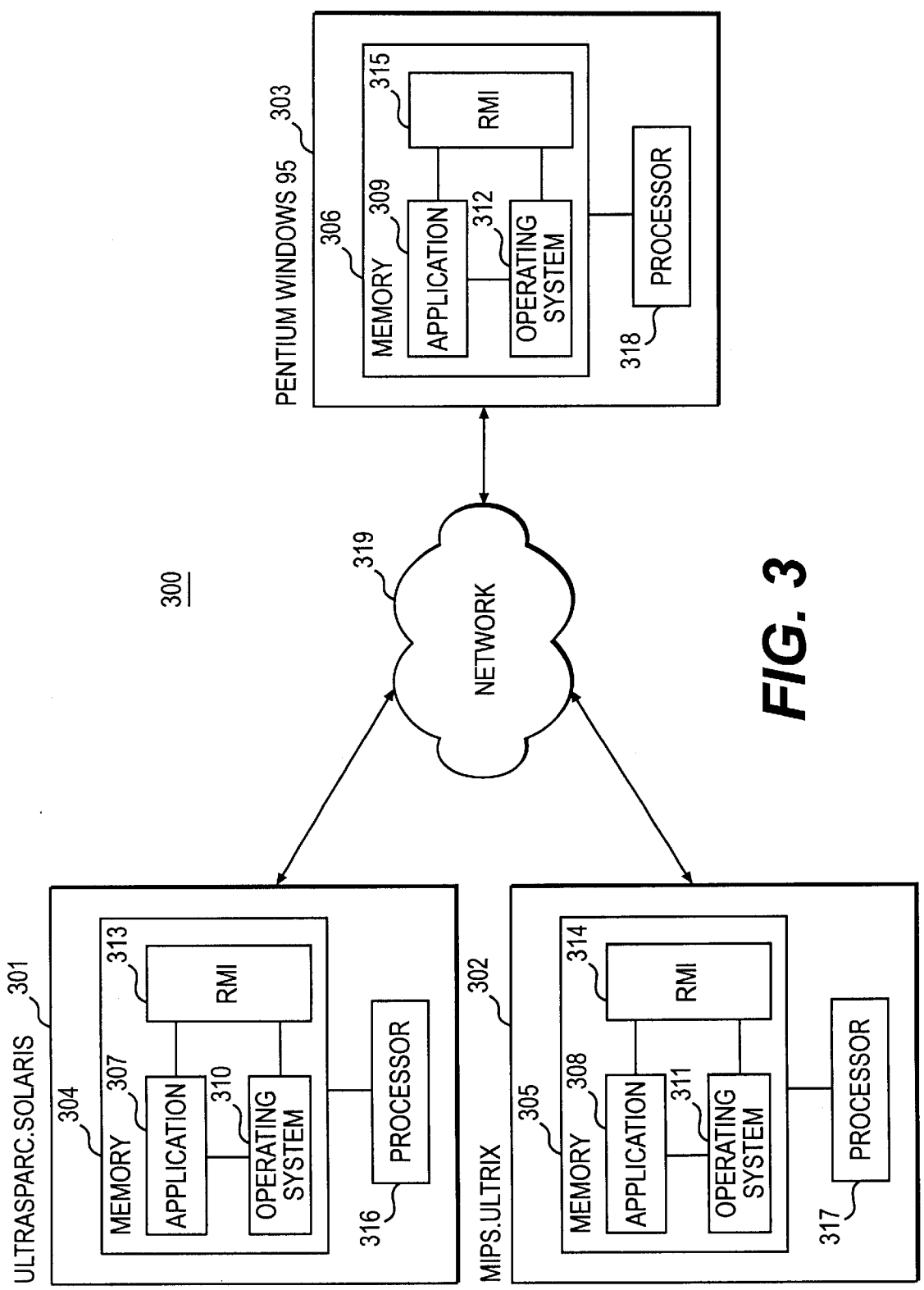
FIG. 3 is a diagram of an exemplary distributed processing system that can be used in an implementation consistent with the present invention.

FIG. 3 illustrates an exemplary distributed processing system 300 which can be used in an implementation consistent with the present invention. In FIG. 3, distributed processing system 300 contains three independent and heterogeneous platforms 301, 302, and 303 connected in a network configuration represented by network cloud 319. The composition and protocol of the network configuration represented by cloud 319 is not important as long as it allows for communication of the information between platforms 301, 302 and 303. In addition, the use of just three platforms is merely for illustration and does not limit an implementation consistent with the present invention to the use of a particular number of platforms. Further, the specific network architecture is not crucial to embodiments consistent with this invention. For example, another network architecture that could be used in an implementation consistent with this invention would employ one platform as a network controller to which all the other platforms would be connected.

In the implementation of distributed processing system 300, platforms 301, 302 and 303 each include a processor 316, 317, and 318 respectively, and a memory, 304, 305, and 306, respectively. Included within each memory 304, 305, and 306, are applications 307, 308, and 309, respectively, operating systems 310, 311, and 312, respectively, and RMI components 313, 314, and 315, respectively.

Applications 307, 308, and 309 can be applications or programs that are either previously written and modified to work with, or that are specially written to take advantage of, the services offered by an implementation consistent with the present invention. Applications 307, 308, and 309 invoke operations to be performed in accordance with an implementation consistent with this invention.

Operating systems 310, 311, and 312 are typically standard operating systems tied to the corresponding processors 316, 317, and 318, respectively. The platforms 301, 302, and 303 can be heterogenous. For example, platform 301 has an UltraSparc® microprocessor manufactured by Sun Microsystems, Inc. as processor 316 and uses a Solaris® operating system 310. Platform 302 has a MIPS microprocessor manufactured by Silicon Graphics Corp. as processor 317 and uses a Unix operating system 311. Finally, platform 303 has a Pentium microprocessor manufactured by Intel Corp. as processor 318 and uses a Microsoft Windows 95 operating system 312. An implementation consistent with the present invention is not so limited and could accommodate homogenous platforms as well.

Sun, Sun Microsystems, Solaris, Java, and the Sun Logo are trademarks or registered trademarks of Sun Microsystems, Inc. in the United States and other countries. UltraSparc and all other SPARC trademarks are used under license and are trademarks of SPARC International, Inc. in the United States and other countries. Products bearing SPARC trademarks are based upon an architecture developed by Sun Microsystems, Inc.

Memories 304, 305, and 306 serve several functions, such as general storage for the associated platform. Another function is to store applications 307, 308, and 309, RMI components 313, 314, and 315, and operating systems 310, 311, and 312 during execution by the respective processor 316, 317, and 318. In addition, portions of memories 304, 305, and 306 may constitute shared memory available to all of the platforms 301, 302, and 303 in network 319. Note that RMI components 313, 314, and 315 operate in conjunction with a JVM, which is not shown for the purpose of simplifying the figure.

Distributed System Infrastructure

Systems and methods consistent with the present invention may also operate within a particular distributed system 400, which will be described with reference to FIGS. 4 and 5. This distributed system 400 is comprised of various components, including hardware and software, to (1) allow users of the system to share services and resources over a network of many devices; (2) provide programmers with tools and programming patterns that allow development of robust, secured distributed systems; and (3) simplify the task of administering the distributed system. To accomplish these goals, distributed system 400 utilizes the Java programming environment to allow both code and data to be moved from device to device in a seamless manner. Accordingly, distributed system 400 is layered on top of the Java programming environment and exploits the characteristics of this environment, including the security offered by it and the strong typing provided by it.

Figure 4:
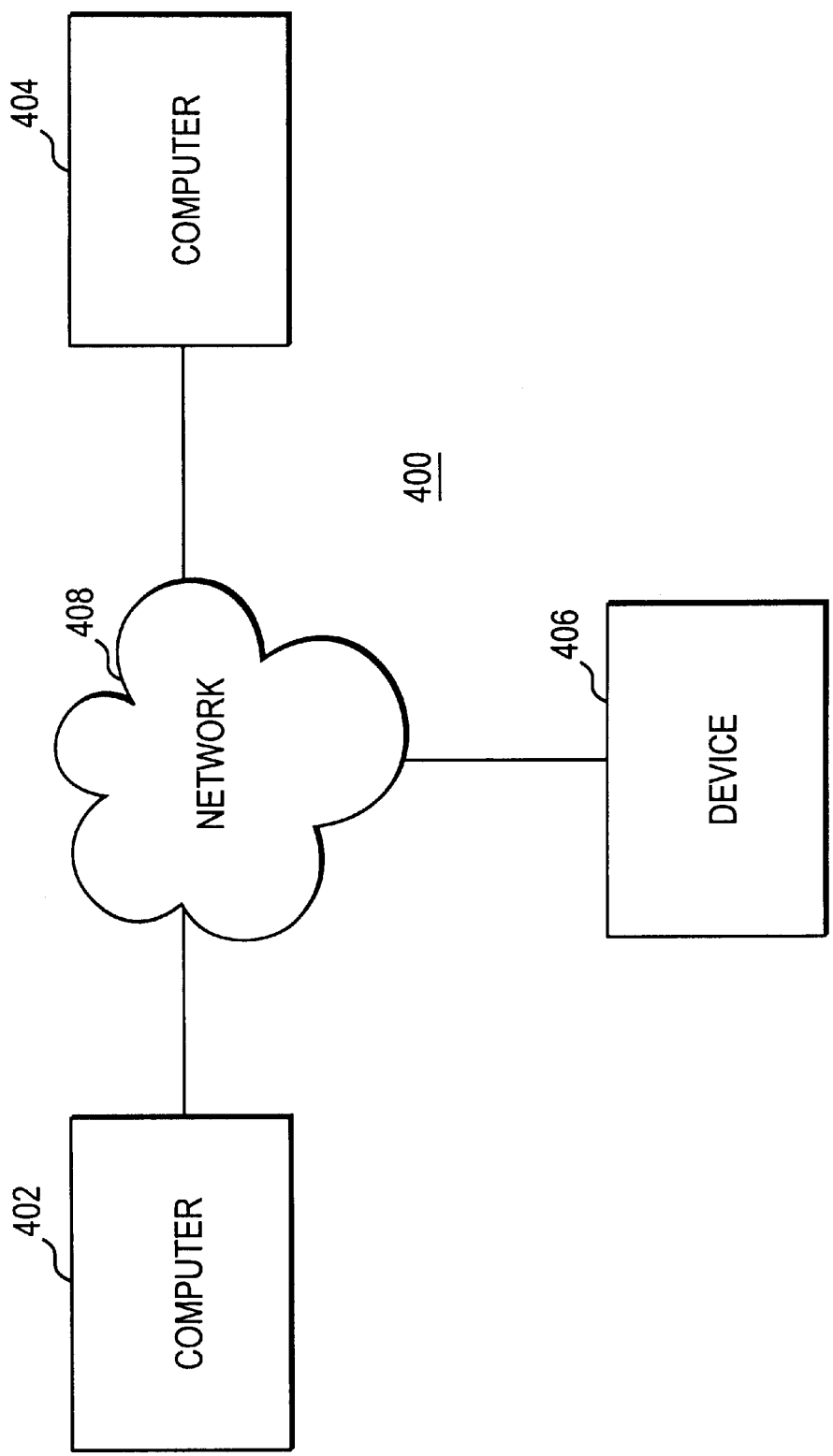
FIG. 4 is a diagram of an exemplary distributed system infrastructure.
Figure 5:
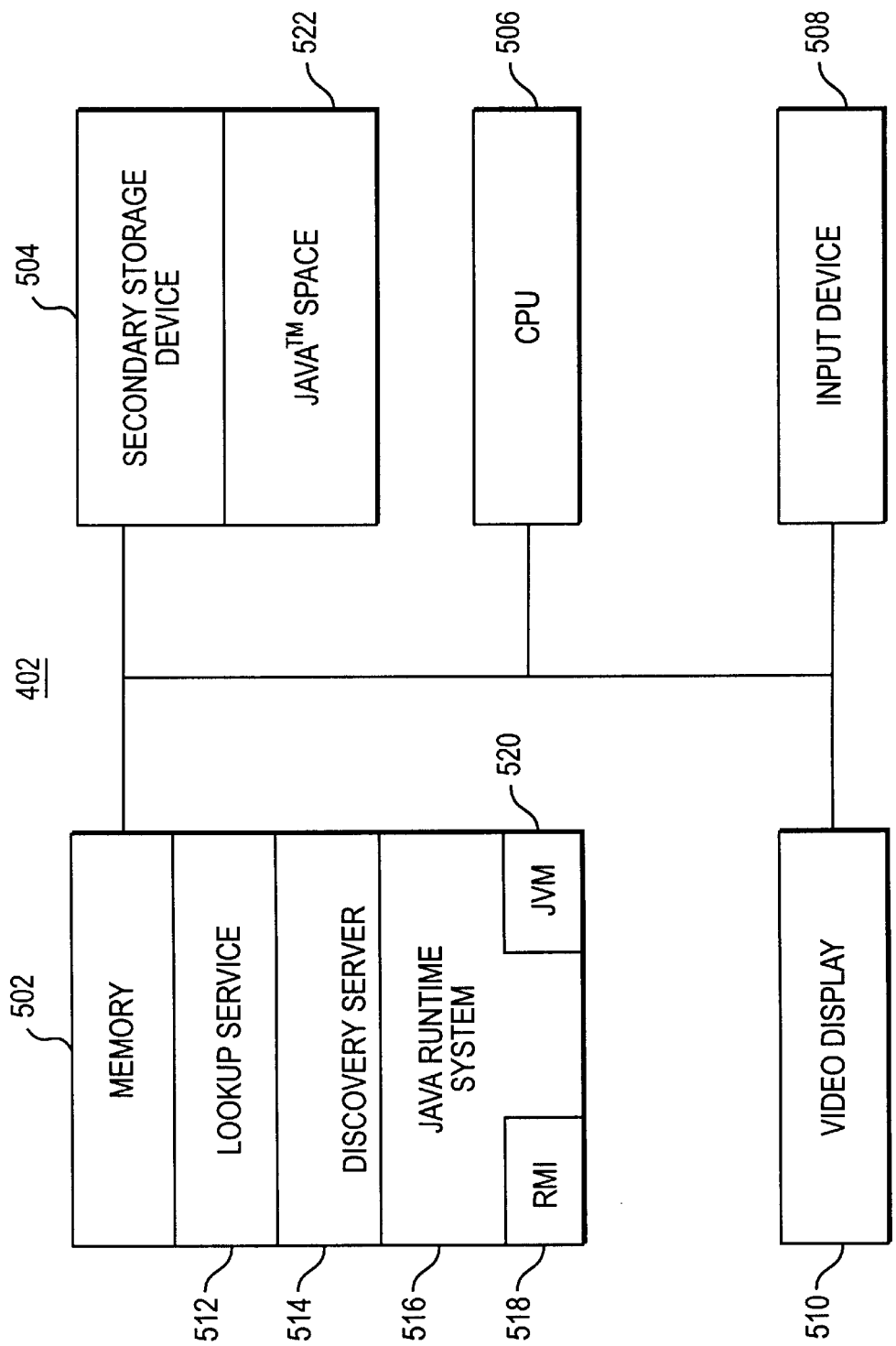
FIG. 5 is a diagram of a computer in a distributed system infrastructure shown in FIG. 4.

In distributed system 400 of FIGS. 4 and 5, different computers and devices are federated into what appears to the user to be a single system. By appearing as a single system, distributed system 400 provides the simplicity of access and the power of sharing that can be provided by a single system without giving up the flexibility and personalized response of a personal computer or workstation. Distributed system 400 may contain thousands of devices operated by users who are geographically disperse, but who agree on basic notions of trust, administration, and policy.

Within an exemplary distributed system are various logical groupings of services provided by one or more devices, and each such logical grouping is known as a Djinn. A "service" refers to a resource, data, or functionality that can be accessed by a user, program, device, or another service and that can be computational, storage related, communication related, or related to providing access to another user. Examples of services provided as part of a Djinn include devices, such as printers, displays, and disks; software, such as programs or utilities; information, such as databases and files; and users of the system.

Both users and devices may join a Djinn. When joining a Djinn, the user or device adds zero or more services to the Djinn and may access, subject to security constraints, any one of the services it contains. Thus, devices and users federate into a Djinn to share access to its services. The services of the Djinn appear programmatically as objects of the Java programming environment, which may include other objects, software components written in different programming languages, or hardware devices. A service has an interface defining the operations that can be requested of that service, and the type of the service determines the interfaces that make up that service.

Distributed system 400 is comprised of computer 402, a computer 404, and a device 406 interconnected by a network 408. Device 406 may be any of a number of devices, such as a printer, fax machine, storage device, computer, or other devices. Network 408 may be a local area network, wide area network, or the Internet. Although only two computers and one device are depicted as comprising distributed system 400, one skilled in the art will appreciate that distributed system 400 may include additional computers or devices.

FIG. 5 depicts computer 402 in greater detail to show a number of the software components of distributed system 400. One skilled in the art will appreciate that computer 404 or device 406 may be similarly configured. Computer 402 includes a memory 502, a secondary storage device 504, a central processing unit (CPU) 506, an input device 508, and a video display 510. Memory 502 includes a lookup service 512, a discovery server 514, and a Java runtime system 516. The Java runtime system 516 includes the Java RMI system 518 and a JVM 520. Secondary storage device 504 includes a Java space 522.

As mentioned above, distributed system 400 is based on the Java programming environment and thus makes use of the Java runtime system 516. The Java runtime system 516 includes the Java API libraries, allowing programs running on top of the Java runtime system to access, in a platform-independent manner, various system functions, including windowing capabilities and networking capabilities of the host operating system. Since the Java API libraries provides a single common API across all operating systems to which the Java runtime system is ported, the programs running on top of a Java runtime system run in a platform-independent manner, regardless of the operating system or hardware configuration of the host platform. The Java runtime system 516 is provided as part of the Java software development kit available from Sun Microsystems, Inc. of Mountain View, Calif.

JVM 520 also facilitates platform independence. JVM 520 acts like an abstract computing machine, receiving instructions from programs in the form of bytecodes and interpreting these bytecodes by dynamically converting them into a form for execution, such as object code, and executing them. RMI 518 facilitates remote method invocation by allowing objects executing on one computer or device to invoke methods of an object on another computer or device. Both RMI and the JVM are also provided as part of the Java software development kit.

Lookup service 512 defines the services that are available for a particular Djinn. That is, there may be more than one Djinn and, consequently, more than one lookup service within distributed system 400. Lookup service 512 contains one object for each service within the Djinn, and each object contains various methods that facilitate access to the corresponding service. Lookup service 512 is described in U.S. patent application entitled "Method and System for Facilitating Access to a Lookup Service," which was previously incorporated herein by reference.

Discovery server 514 detects when a new device is added to distributed system 400, during a process known as boot and join (or discovery), and when such a new device is detected, the discovery server passes a reference to lookup service 512 to the new device so that the new device may register its services with the lookup service and become a member of the Djinn. After registration, the new device becomes a member of the Djinn, and as a result, it may access all the services contained in lookup service 512. The process of boot and join is described in U.S. patent application entitled "Apparatus and Method for providing Downloadable Code for Use in Communicating with a Device in a Distributed System," which was previously incorporated herein by reference.

A Java space 522 is an object repository used by programs within distributed system 400 to store objects. Programs use a Java space 522 to store objects persistently as well as to make them accessible to other devices within distributed system 400. Java spaces are described in U.S. patent application Serial No. 08/971,529, entitled "Database System Employing Polymorphic Entry and Entry Matching," now U.S. Pat No. 6,032,151, assigned to a common assignee, and filed on Nov. 17, 1997, which is incorporated herein by reference. One skilled in the art will appreciate that an exemplary distributed system 400 may contain many lookup services, discovery servers, and Java spaces.

Data Flow in a Distributed Processing System

Figure 6:
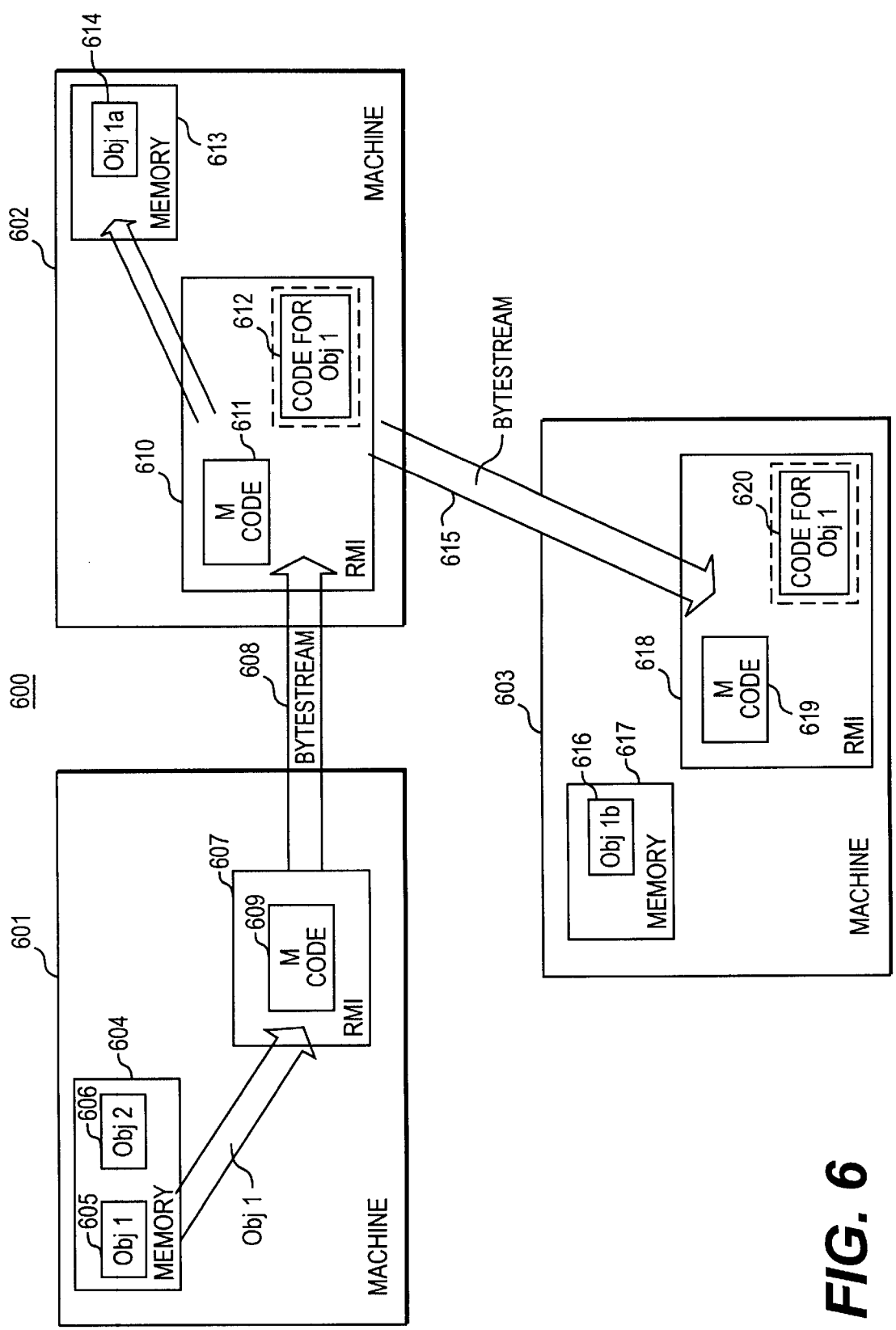
FIG. 6 is a diagram of a flow of objects within a distributed processing system consistent with the present invention.

FIG. 6 is a diagram of an object-oriented distributed system 600 connecting machines 601, 602, and 603, such as computers or virtual machines executing on one or more computers, or the machines described with reference to FIG. 3. Transmitting machine 601 includes a memory 604 storing objects such as objects 605 and 606, and RMI 607 for performing processing on the objects. To transmit an object over network 600, RMI 607 uses code 609 for converting object 605 into a marshalled object that is transmitted as a byte stream 608 to machine 602. Streams used in the Java programming language, including input and output streams, are known in the art and an explanation, which is incorporated herein by reference, appears in, for example, a text entitled "The Java Tutorial: Object-Oriented Programming for the Internet," pp. 325–53, by Mary Campione and Kathy Walrath, Addison-Wesley, 1996.

Part of this conversion includes adding information so that a receiving machine 602 can reconstruct the object. When a set of object types is limited and is the same on all machines 601, 602, and 603, a receiving machine typically requires the object's state and a description of its type because the object's code is already present on all network machines. Alternatively, machine 601 uses RMI 607 to provide more flexibility, allowing code to be moved when necessary along with information or the object's state and type. Additionally, a transmitting machine includes in the marshalled object an identification of the type of object transmitted, the data constituting the state of the object, and a network-accessible location in the form of a URL for code that is associated with the object. URLs are known in the art and an explanation, which is incorporated herein by reference, appears in, for example, a text entitled "The Java Tutorial: Object-Oriented Programming for the Internet," pp. 494–507, by Mary Campione and Kathy Walrath, Addison-Wesley, 1996.

When receiving machine 602 receives byte stream 608, it identifies the type of transmitted object. Machine 602 contains its own RMI 610 and code 611 for processing of objects. If byte stream 608 contains a marshalled object, machine 602 may create a new object 614 using the object type identified in the marshalled object, the state information, and code for the object. Object 614 is a copy of object 605 and is stored in memory 613 of machine 602. If code 612 is not resident or available on machine 602 and the marshalled object does not contain the code, RMI 610 uses the URL from the marshalled object to locate the code and transfer a copy of the code to machine 602. Code 612 is generally only required if the object is unmarshalled. Because the code is in bytecode format and is therefore portable, the receiving machine can load the code into RMI 610 to reconstruct the object. Thus, machine 602 can reconstruct an object of the appropriate type even if that kind of object has not been present on the machine before.

Machine 602 may also convert object 614 into byte stream 615 for transmission to a third machine 603, which contains its own RMI 618 and code 619 for processing objects. RMI 618, using code 620 for the object, converts byte stream 615 into a corresponding object 616, which it stores in memory 617. Object 616 is a copy of object 605. If code 620 for the object is not resident or available, machine 603 requests the code from another machine using the URL, as described above.

Machine 602 may alternatively store the marshalled object as a byte stream without reconstructing the object. It may then transmit the byte stream to machine 603.

Marshalled Object

A marshalled object is a container for an object that allows that object to be passed as a parameter in RMI call, but postpones conversion of the marshalled object at the receiving machine until a program executing on the receiving machine explicitly requests the object via a call to the marshalled object. A container is an envelope that includes the data and either the code or a reference to the code for the object, and that holds the object for transmission. The serializable object contained in the marshalled object is typically serialized and deserialized when requested with the same semantics as parameters passed in RMI calls. Serialization is a process of converting an in-memory representation of an object into a corresponding self-describing byte stream. Deserialization is a process of converting a self-describing byte stream into the corresponding object.

To convert an object into a marshalled object, the object is placed inside a marshalled object container and when a URL is used to locate code for the object, the URL is added to the container. Thus, when the contained object is retrieved from its marshalled object container, if the code for the object is not available locally, the URL added to the container is used to locate and load code in bytecode format for the object's class.

Table 1 provides an exemplary class definition in the Java programming language for a marshalled object consistent with the present invention.

Table 1

```
package java.rmi;
public final class MarshalledObject implements java.io.Serializable
{
    public MarshalledObject (Object obj)
        throws java.io.IOException;
    public Object get ()
        throws java.io.IOExecption, ClassNotFoundException;
    public int hashCode ();
    public boolean equals(); }
```

A marshalled object may be embodied within an article of manufacture specifying a representation of the object stored in a computer-readable storage medium.

A marshalled object's constructor takes a serializable object (obj) as its single argument and holds the marshalled representation of the object in a byte stream. The marshalled representation of the object preserves the semantics of objects that are passed in RMI calls: each class in the stream is typically annotated with either the object's code or a URL to the code so that when the object is reconstructed by a call to a "get" method, the bytecodes for each class can be located and loaded, and remote objects are replaced with their proxy stubs. The "get" method is a method called by a program to execute a process of unmarshalling, which is reconstruction of an object from a marshalled object using a self-describing byte stream (the marshalled object), and a process to obtain the necessary code for that process. A proxy stub is a reference to a remote object for use in reconstructing an object.

When an instance of the class marshalled object is written to a "java.io.ObjectOutputStream," the contained object's marshalled form created during construction is written to the stream. Thus, only the byte stream is serialized.

When a marshalled object is read from a "java.io.ObjectInputStream," the contained object is not deserialized into a new object. Rather, the object remains in its marshalled representation until the marshalled object's get method is called.

The "get" method preferably always reconstructs a new copy of the contained object from its marshalled form. The internal representation is deserialized with the same semantics used for unmarshalling parameters for RMI calls. Thus, the deserialization of the object's representation loads class codes, if not available locally, using the URL annotation embedded in the serialized stream for the object.

As indicated in the class definition for a marshalled object, the hash code of the marshalled representation of an object is defined to be equivalent to the hash code for the object itself. In general, a hash code is used in hash tables to perform fast look-ups of information, which is known in the art. The equals method will return true if the marshalled representation of the objects being compared are equivalent. An equals method verifies reconstruction by determining if a reconstructed object is the same as the original object, and such methods are known in the Java programming language.

Transmission of a Marshalled Object

Figure 7:
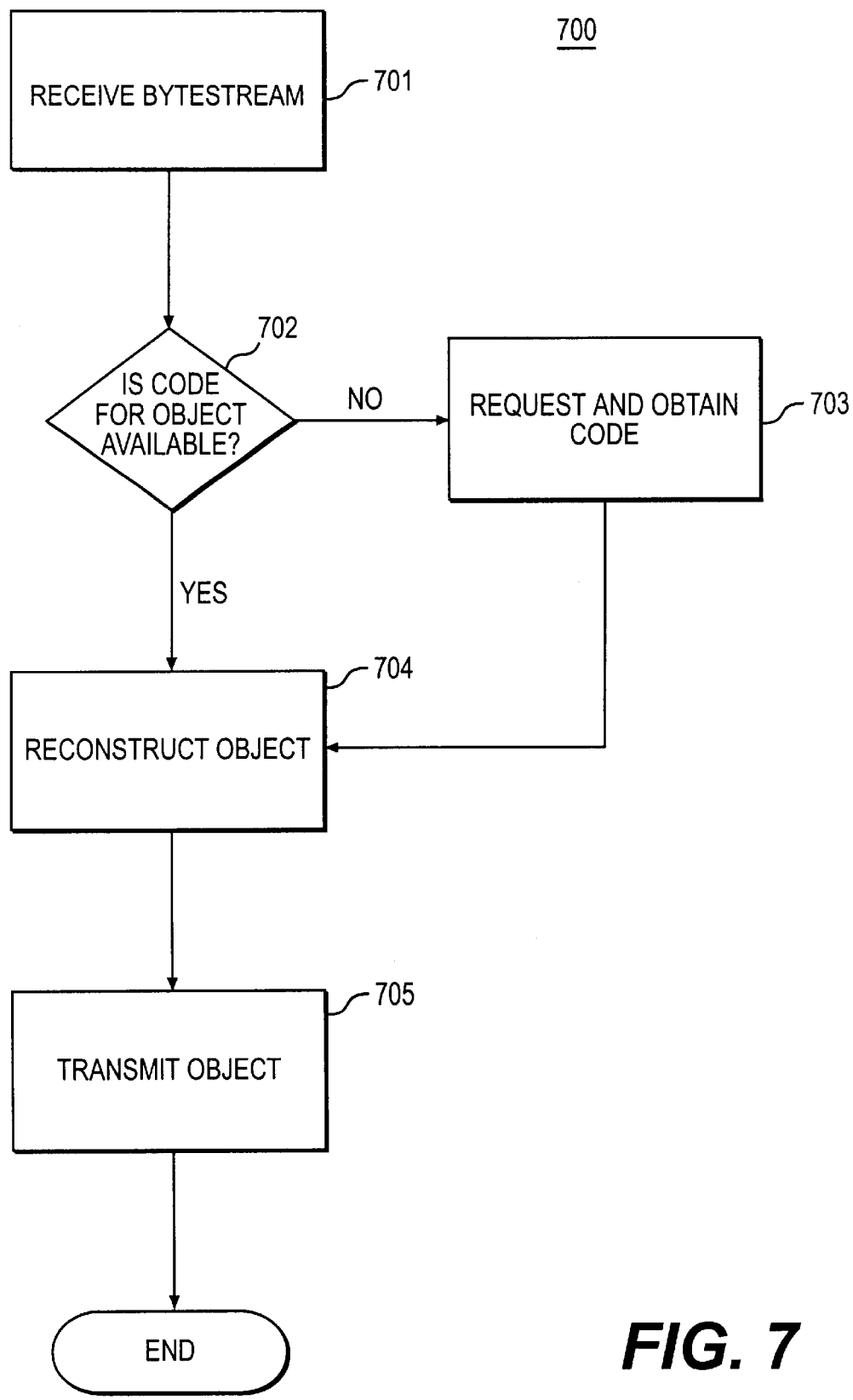
FIG. 7 is a flow diagram of steps performed in transmitting objects in a distributed system using loading of remote code for construction of an object in an implementation consistent with the present invention.

FIG. 7 is a flow diagram of steps 700 preferably performed in transmitting objects in a distributed system consistent with the present invention. A machine receives a byte stream (step which includes data for the object, information identifying the type of object, and optionally a URL for the code that is associated with the object. The receiving machine determines if the code for the object is resident or available (step 702). If it is available, the machine preferably uses RMI for reconstructing the object from the byte stream and resident code (step 704). If the code is not resident, the machine uses the URL from the byte stream to request the code from another machine located at a network accessible location, and that machine returns a copy of the code (step 703). The object can also be transmitted in the form of a byte stream to another machine (step 705).

Figure 8:
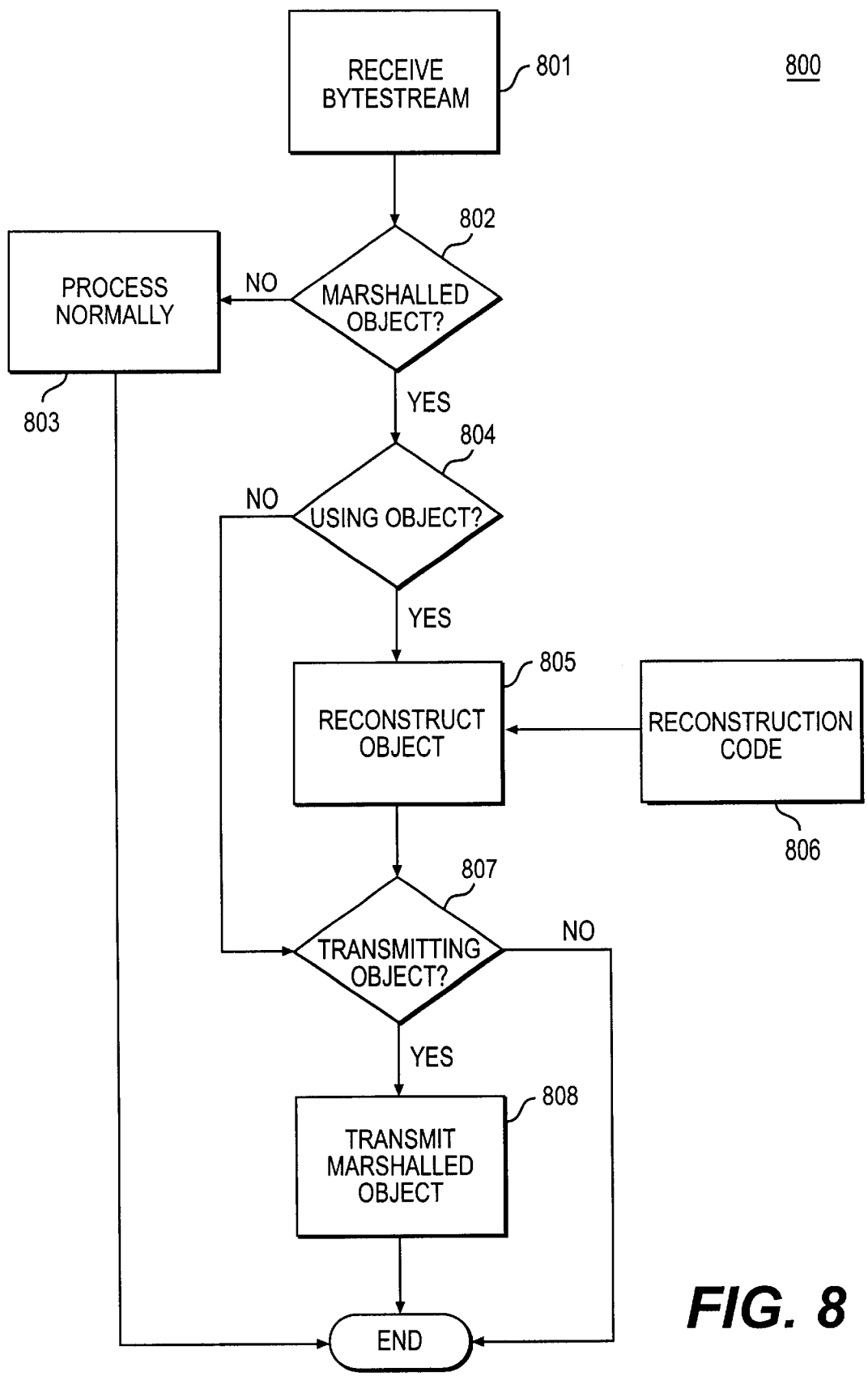
FIG. 8 is a flow diagram of steps performed for deferring code loading and construction of objects when transmitting objects in a distributed system consistent with the present invention.

FIG. 8 is a flow diagram of steps 800 preferably performed for deferring code loading and construction of objects when transmitting marshalled objects in a distributed system consistent with the present invention. A machine receives a byte stream (step 801), which includes data for the object, information identifying the type of object, and optionally a URL. for the code that is associated with the object.

The machine determines if the byte stream is a marshalled object (step 802). If it is not such an object, the machine performs normal processing of the byte stream (step 803). Otherwise, if the received byte stream represents a marshalled object, the machine holds the marshalled object for later use in response to a get method invoked by a process on the receiving machine. If the receiving machine determines that the object is to be transmitted to another machine (step 804), it simply transmits the byte stream without reconstructing the object. If the machine uses the object, it performs reconstruction of the object using its RMI and associated code (step 805). If the reconstruction code for the object is not resident on the machine, it uses a URL to request and obtain the code (step 806), as described above. The machine determines if it needs to transmit the object to another machine (step 807). If the object is destined for another machine, it is transmitted as a byte stream (step 808).

Accordingly, a marshalled object provides for more efficient transfer of objects in a distributed system. If an object is needed by a machine, it can be reconstructed, and if the machine does not need to use the object, it can transmit the marshalled object without reconstructing it.

Use of a Marshalled Object in Event Notification

Figure 9:
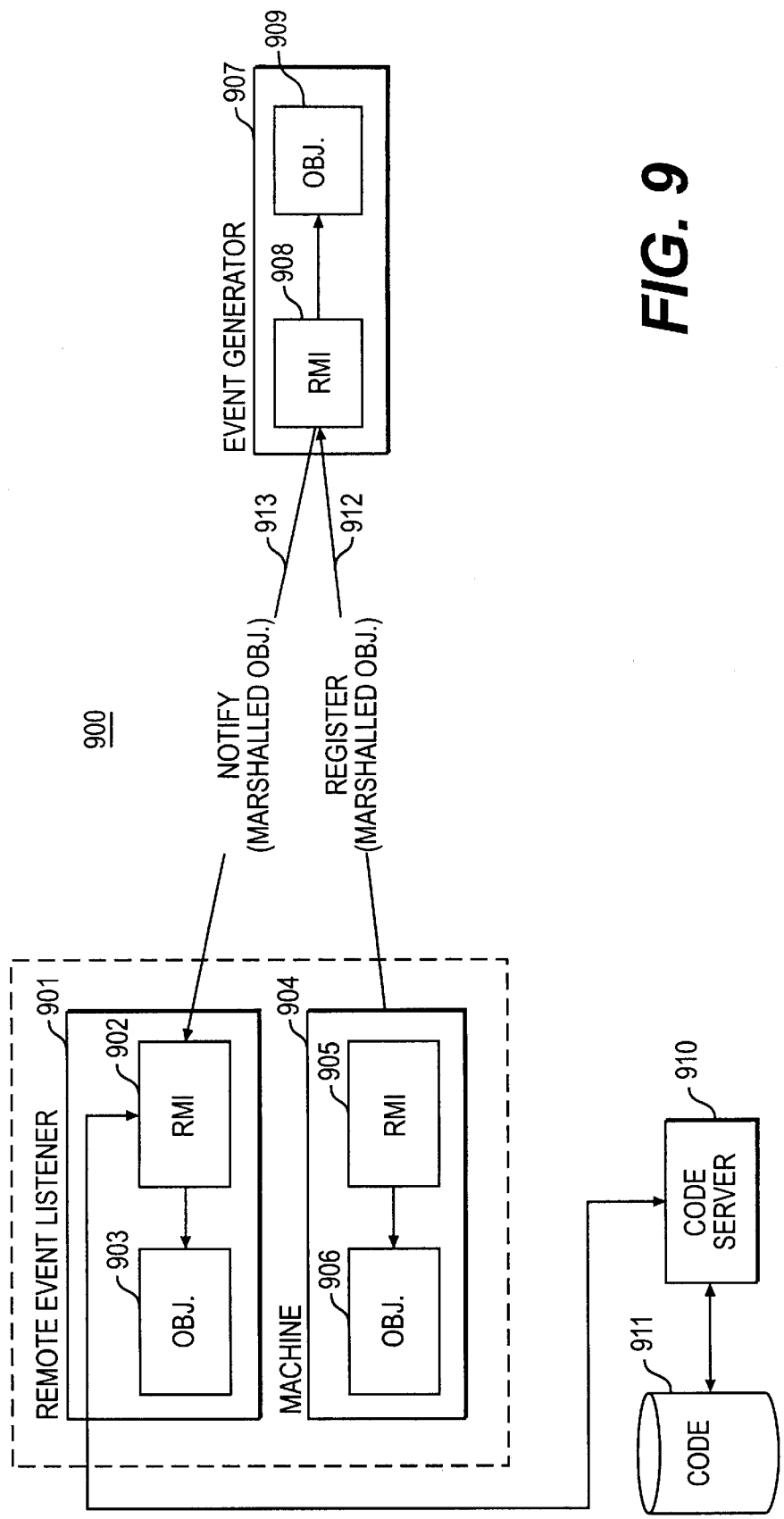
FIG. 9 is a diagram of a distributed network illustrating event notification.

A distributed system or network may use marshalled objects in conjunction with registration for notification of events within the system. FIG. 9 is a diagram of a distributed network 900 illustrating event notification. Network 900 may use the machines described with reference to FIGS. 3, 4, and 5. Network 900 includes a remote event listener 901 having RMI 902 and object 903, a machine 904 having RMI 905 and object 906, and an event generator 907 having RMI 908 and object 909 for providing event notification. Machine 904 may be the same as remote event listener 901, as indicated by the dashed line, or they may be separate machines.

Machine 904, desiring notification of a particular network event, registers with RMI 908 by transmitting a request for event notification including or associated with a marshalled object 912. Event generator 907 stores the marshalled object for possible later transmission. When RMI 908 detects an occurrence of the event, it transmits notification of the event along with the marshalled object 913 to remote event listener 901. Remote event listener 901 may make a call to code server 910 in order to obtain code 911 for reconstructing the marshalled object, which may contain information relating to the event. A code server is an entity and process that has access to code and responds to requests for a particular type or class of object and returns code for that object. A code server may be located within machine 901 or on another machine. Also, the code may be resident on the same platform as the code server or on a separate platform. After registration, remote event listener 901 may provide indications of the particular event when detected.

Figure 10:
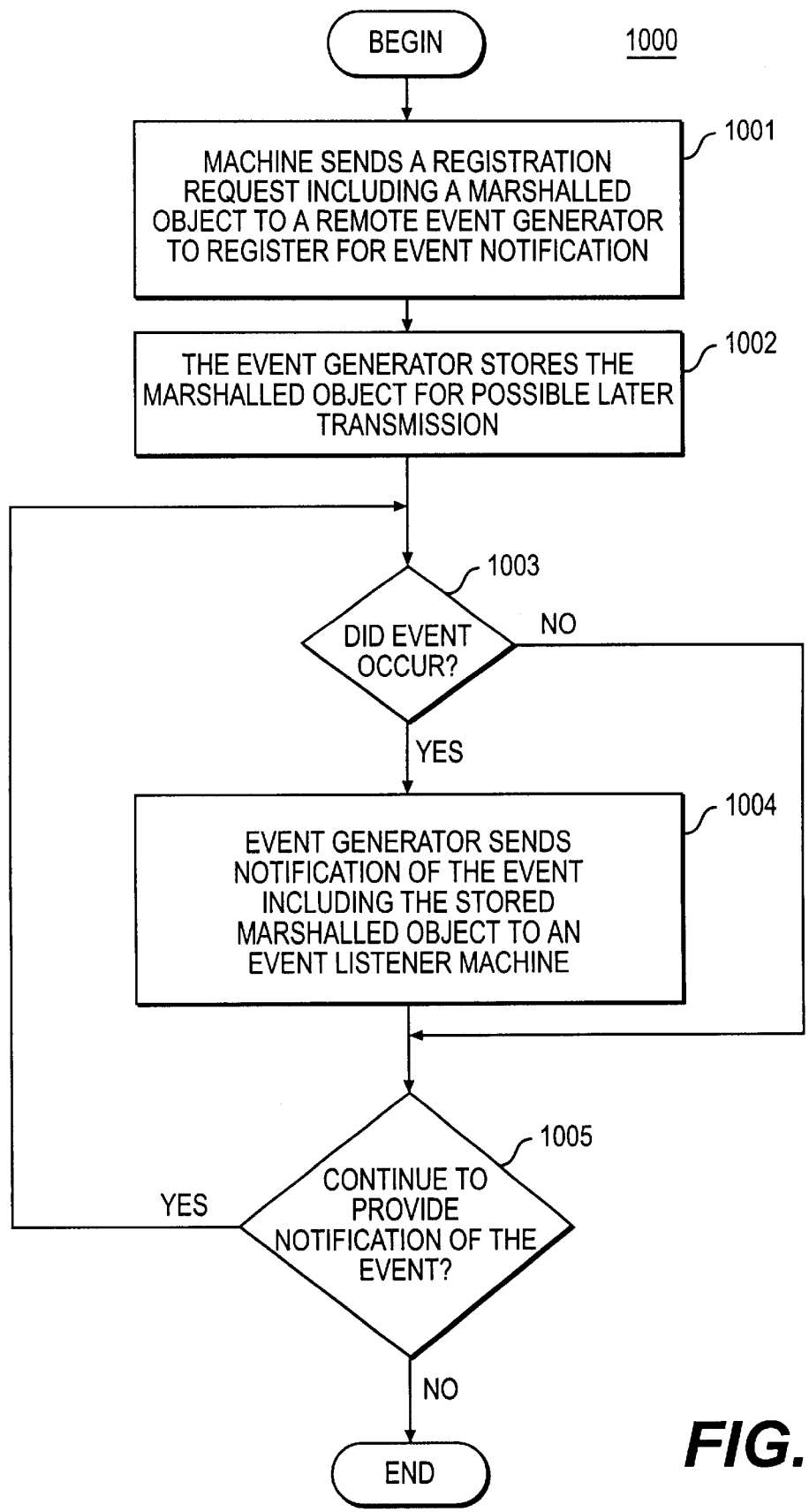
FIG. 10 is a flow chart of a process for event notification within a distributed network.

FIG. 10 is a flow chart of a process 1000 or event notification within a distributed network, such as network 900. A machine sends a registration request including a marshalled object to a remote event generator (step 1001), which stores the marshalled object for possible later transmission (step 1002). The event generator determines if the event occurred (step 1003), and, if it detects such an occurrence, it sends notification of the event including the stored marshalled object to an event listener machine (step 1004). The event generator determines, based on particular criteria or system requirements, if it is to continue providing notification of occurrences of the event (step 1005). If so, it continues to determine if the event occurred. These steps may use, for example, interfaces and class definitions written in the Java programming language shown in Tables 1–5 provided in this specification.

Table 2 provides an example of an interface in the Java programming language for implementing a remote event listener.

Table 2
public interface RemoteEventListener extends Remote,
    java.util.EventListener
{
    void notify(RemoteEvent theEvent)
        throws EventUnknownException, RemoteException;
}

In the interface shown in Table 2, the notify method has a single parameter of type "RemoteEvent" that is used during operation to encapsulate the information passed as part of a notification. Table 3 provides an example of a definition for the public part of the "RemoteEvent" class definition.

Table 3
public class RemoteEvent extends EventObject
{
    public RemoteEvent (Object evSource,
        long evIdNo,
        long evSeqNo)
    public Object getSource ( );
    public long getID( );
    public long getSeqNo ( );
    public MarshalledObject getRegistrationObject ( );
}

In the definition shown in Table 3, the abstract state contained in a "RemoteEvent" object includes a reference to the object in which the event occurred, a "long" which identifies the kind of event relative to the object in which the event occurred, and a "long" which indicates the sequence number ("SeqNo") of this instance of the event kind. The sequence number obtained from the "RemoteEvent" object is an increasing value that may provide an indication concerning the number of occurrences of this event relative to an earlier sequence number.

Table 4 provides an example of an interface in the Java programming language for an event generator.

Table 4
public interface EventGenerator extends Remote
{
    public EventRegistration register (long evId,
        MarshalledObject handback,
        RemoteEventListener toInform,
        long leaseperiod)
        throws EventUnknownException, RemoteException;
}

The register method shown in Table 4 allows registration of interest in the occurrence of an event inside an object. While executing this method, a JVM receives an "evId," which is a long integer used to identify the class of events; an object that is transmitted back as part of the notification; a reference to a "RemoteEventListener" object; and a long integer indicating the leasing period for the interest registration. If an "evId" is provided to this call that is not recognized by the event generator object, the JVM signals an error. In the Java programming language, a JVM is said to "throw" an "EventUnknownException" to signal that error. The second argument of the register method is a marshalled object that is to be transmitted back as part of the notification generated when an event of the appropriate type occurs. The third argument of the register method is a remote event listener object that receives any notifications of instances of the event kind occurring. This argument may be the object that is registering interest, or it may be another remote event listener such as a third-party event handler or notification "mailbox." The final argument to the register method is a "long" indicating the requested duration of the registration, referred to as the "lease."

The return value of the register method is an object of the event registration class definition. This object contains a "long" identifying the kind of event in which interest was registered relative to the object granting the registration, a reference to the object granting the registration, and a lease object containing information concerning the lease period.

Table 5 provides an example of a class definition in the Java programming language for event registration.

Table 5
public class EventRegistration implements java.io.Serializable {
    public EventRegistration (long eventNum,
        Remote registerwith,
        Lease eventLease,
        long currentSeqNum);
    public long getEventID ( );
    public Object getEventSource ( );

```
public Lease getLease ( );
public long currentSeqNum ( );
}
```

In the class definition shown in Table 5, the "getEventID" method returns the identifier of the event in which interest was registered, which combined with the return value of the "getEventSource" method uniquely identifies the kind of event. This information is provided to third-party repositories to allow them to recognize the event and route it correctly. During operation in a JVM, the "getlease" method returns the lease object for this registration and is used in lease maintenance. The "currentSeqNo" method returns the value of the sequence number on the event kind that was current when the registration was granted, allowing comparison with the sequence number in any subsequent notifications. A "toString" method may be used with this class definition to return a human-readable string containing the information making up the state of the object.

Machines implementing the steps shown in FIGS. 7, 8, and 10 may include computer processors for performing the functions, as shown in FIGS. 3, 4, and 5. They may include modules or programs configured to cause the processors to perform the above functions. They may also include computer program products stored in a memory. The computer program products may include a computer-readable medium or media having computer-readable code embodied therein for causing the machines to perform functions described above. The media may include a computer data signal embodied in a carrier wave and representing sequences of instructions which, when executed by a processor, cause the processor to securely address a peripheral device at an absolute address by performing the method described in this specification. The media may also include data structures for use in performing the method described in this specification.

Although the illustrative embodiments of the systems consistent with the present invention are described with reference to a computer system implementing the Java programming language on the JVM specification, the invention is equally applicable to other computer systems processing code from different programming languages. Specifically, the invention may be implemented with both object-oriented and nonobject-oriented programming systems. In addition, although an embodiment consistent with the present invention has been described as operating in the Java programming environment, one skilled in the art will appreciate that the present invention can be used in other programming environments as well.

While the present invention has been described in connection with an exemplary embodiment, it will be understood that many modifications will be readily apparent to those skilled in the art, and this application is intended to cover any adaptations or variations thereof.

For example, different labels or definitions for the marshalled object may be used without departing from the scope of the invention. This invention should be limited only by the claims and equivalents thereof.

What is claimed is:

1. A method for transmitting objects in a distributed system comprised of multiple machines, comprising:
   specifying an object associated with a request for notification of a particular event within the system;
   converting the object into a stream containing a self-describing form of the object; and
   deferring reconstruction of the object until the event has occurred and the stream has been transmitted.

2. The method of claim 1 wherein the deferring includes storing the stream prior to the transmission.

3. The method of claim 1 wherein the converting includes packaging the object in an unconstructed package including a reference to the program code for reconstructing the object.

4. A method for processing objects in a distributed system comprised of multiple machines, comprising:
   receiving at a first machine a stream containing a self-describing form of an object associated with a request for notification of a particular event within the system;
   determining whether to send the stream to a second machine; and
   selectively sending the stream to the second machine for reconstruction of the object by accessing program code identified in the stream, the first machine providing notification of the event.

5. An apparatus for transmitting objects in a distributed system comprised of multiple machines, comprising:
   a module configured to specify an object associated with a request for notification of a particular event within the system;
   a module configured to convert the object into a stream containing a self-describing form of the object; and
   a module configured to defer reconstruction of the object until the event has occurred and the stream has been transmitted.

6. The apparatus of claim 5 wherein the deferring module includes a module configured to store the stream prior to the transmission.

7. The apparatus of claim 5 wherein the converting module includes a module configured to package the object in an unconstructed package including a reference to the program code for reconstructing the object.

8. An apparatus for processing objects in a distributed system comprised of multiple machines, comprising:
   a module configured to receive at a first machine a stream containing a self-describing form of an object associated with a request for notification of a particular event within the system;
   a module configured to determine whether to send the stream to a second machine; and
   a module configured to defer reconstruction of the object until the event has occurred and the stream has been transmitted.

9. A system for transmitting objects in a distributed system comprised of multiple machines, comprising:
   a first machine;
   a second machine;
   a network connecting the first machine with the second machine; and
   an apparatus for transmitting objects in the system, the apparatus including:
      a module configured to specify an object associated with a request for notification of a particular event within the system;
      a module configured to convert the object into a stream containing a self-describing form of the object; and
      a module configured to defer reconstruction of the object until the event has occurred and the stream has been transmitted.

10. The system of claim 9 wherein the providing module includes
    a module configured to store the stream prior to the transmission.

11. The system of claim 9 wherein the converting module includes a module configured to package the object in an unconstructed package including a reference to the program code for reconstructing the object.

12. A system for transmitting objects in a distributed system comprised of multiple machines comprising:
- a first machine;
- a second machine;
- a network connecting the first machine with the second machine; and
- an apparatus for transmitting objects in the system, the apparatus including:
  - a module configured to receive at the first machine a stream containing a self-describing form of an object associated with a request for notification of a particular event within the system;
  - a module configured to determine whether to send the stream to the second machine; and
  - a module configured to defer reconstruction of the object until the event has occurred and the stream has been transmitted.

13. A computer program product, comprising:
- a computer-readable medium containing instructions for controlling a computer system to perform a method, the method including:
  - specifying an object associated with a request for notification of a particular event within the system;
  - converting the object into a stream containing a self-describing form of the object; and deferring reconstruction of the object until the event has occurred and the stream has been transmitted.

14. The computer program product of claim 13 wherein the providing includes storing the stream prior to the transmission.

15. The computer program product of claim 13 wherein the converting includes packaging the object in an unconstructed package including a reference to the program code for reconstructing the object.

16. A computer program product, comprising:
- a computer-readable medium containing instructions for controlling a computer system to perform a method, the method including:
  - receiving at a first machine a stream containing a self-describing form of an object associated with a request for notification of a particular event within the system;
  - determining whether to send the stream to a second machine; and deferring reconstruction of the object until the event has occurred and the stream has been transmitted.

17. An article of manufacture specifying a representation of an object stored in a computer-readable storage medium and capable of electronic transmission between machines in a distributed system, the article of manufacture comprising:
- a first object comprising a self-describing stream stored in a computer-readable storage medium, the first object being associated with a second object specifying a request for notification of an event in the system, the first object having a property indicating that the first object is to be maintained as the stream until the event has occurred and the stream has been transmitted.

18. The article of manufacture of claim 17 wherein the stream includes computer-readable instructions for use in reconstructing the second object.

19. The article of manufacture of claim 17 wherein the stream includes a location of computer-readable instructions for use in reconstructing the second object.

20. An apparatus for transmitting objects in a distributed system comprised of multiple machines, comprising:
- means for specifying an object associated with a request for notification of a particular event within the system;
- means for converting the object into a stream containing a self-describing form of the object; and
- means for deferring reconstruction of the object until the event has occurred and the stream has been transmitted.

* * * * *